Patented Sept. 15, 1953

2,652,399

UNITED STATES PATENT OFFICE 2,652,399

TERTIARY-AMINOALKYL DERIVATIVES OF COUMARILIC ACIDS AND THEIR PREPARATION

Raymond O. Clinton, Rensselaer, N. Y., assignor to Sterling Drug Inc., New York, N. Y., a corporation of Delaware No Drawing. Application October 24, 1950, Serial No. 191,923

22 Claims. (Cl. 260—294.3)

This invention relates to a new class of compounds derived from certain coumarilic acids, and to the preparation of this new class of compounds.

The compounds of my invention have the general formula

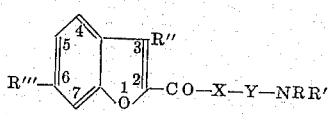

where X is O, S or NH, Y is a lower alkylene radical, NRR' is a lower aliphatic-like tertiary-amino radical, R'' is hydrogen or a lower alkyl radical and R''' is hydrogen, a lower alkyl radical or a lower alkoxy radical.

In the above general formula, when R'' and R''' represent lower alkyl radicals, they have preferably 1–6 carbon atoms, including such examples as methyl, ethyl, n-propyl, n-butyl, isobutyl, 2-butyl, n-amyl, 3-amyl, n-hexyl, and the like. When R''' represents a lower alkoxy radical, it has preferably 1–6 carbon atoms, including such examples as methoxy, ethoxy, n-propoxy, n-butoxy, isobutoxy, 2-amoxy, n-hexoxy, and the like. The lower alkylene radical designated hereinabove as Y has preferably 2–6 carbon atoms and has its two free valence bonds on different carbon atoms. Thus, Y includes such examples as —CH₂CH₂—, —CH₂CH₂CH₂—,

—CH₂CH(CH₃), —CH₂CH₂CH₂CH₂—,

—CH₂CH(CH₃)CH₂—, —CH₂CH₂CH₂CH(CH₃),

—CH₂CH₂C(CH₃)₂CH₂—,

—CH₂CH₂CH₂CH₂CH₂CH₂—, and the like. The lower aliphatic-like tertiary-amino radical shown above as NRR' comprehends lower dialkylamino radicals where R and R' are lower alkyl radicals, alike or different, and each alkyl radical having preferably 1–6 carbon atoms, such dialkylamino radicals including dimethylamino, diethylamino, ethylmethylamino, n-propylmethylamino, diisopropylamino, di-n-butylamino, di-n-hexylamino, and the like. Further, the lower aliphatic-like tertiary-amino radical designated as NRR' encompasses those radicals where R and R' are joined directly or through an oxygen atom to form saturated N-heteromonocyclic radicals having 5–6 ring atoms, illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

I prepared the compounds of my invention by reacting a coumarilic acid halide of the formula

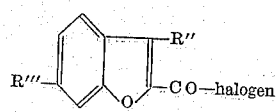

with a tertiary-amino compound of the formula H—X—Y—NRR', where R'', R''', X, Y and NRR' have the meanings designated hereinabove. In practicing my invention, I preferably used coumarilic acid chlorines because of the ease of their preparation from the readily available, inexpensive halogenating agent, thionyl chloride. Specific illustrations of this method of preparation are given as follows where X is each of O, S and NH, the resultant products being respectively an ester, a thiol ester and an amide. Reaction of 3-ethyl-6-n-amoxycoumarilic acid chloride with each of 2-(2,5-dimethyl-1-pyrrolidyl)-ethanol, 3-(1-piperidyl)propanethiol and 4-dimethylaminobutylamine results respectively in the formation of 2-(2,5-dimethyl-1-pyrrolidyl)ethyl 3-ethyl-6-n-amoxycoumarilate, 3-(1-piperidyl)propyl 3-ethyl-6-n-amoxythiolcoumarilate and N-(4-dimethylaminobutyl)-3-ethyl-6-n-amoxycoumarilamide. When prepared in such a manner from the coumarilic acid chlorides, the resultant compounds are obtained in the form of their respective hydrochloride addition salts. The compounds in free base form are conveniently prepared by neutralizing the hydrogen chloride portion of the salts with appropriate alkaline reagents suitable for the purpose, such as sodium hydroxide, sodium carbonate, sodium bicarbonate, etc.

I found it convenient to run the reaction of the coumarilic acid halides with the tertiary-amino alcohols, thiols or amines in the presence of an inert non-polar solvent such as benzene, toluene, xylene, a petroleum ether fraction, etc. Benzene was preferably used in practicing my invention because of its low cost and ready availability. The reaction can also be run, but less conveniently, in the absence of a solvent. The choice of solvent is not critical.

As already pointed out above, the coumarilic acid halides were preferably prepared by treating the acid with thionyl chloride. However, other halogenating agents also can be used, such as phosphorus oxychloride, phosphorus tribromide, phosphorous pentachloride, etc.; however, these agents suffer the disadvantages of being more expensive and less conveniently handled than thionyl chloride.

The intermediate coumarilic acids are generally old in the art. Their ease of preparation from the correspoiding coumarins by treatment of the coumarin dibromides with potassium hydroxide is exemplified in the preparation of coumarilic acid from coumarin by Fuson et al. in Organic Syntheses, volume 24, page 33 (1944). In using this method to prepare intermediate coumarilic acids bearing substituents in the 3 and 6 positions, the corresponding coumarin derivative is chosen that bears substituents in the 4 and 7 positions respectively. For example, 3-n-butyl-6-ethoxycoumarilic acid is formed from 4 - n-butyl-7-ethoxycoumarin; 3-ethyl-6-n-propoxycoumarilic acid, from 4-ethyl-7-n-propoxycoumarin; etc.

In view of the method used in preparing the compounds of my invention, it was convenient to isolate and use these esters, thiol esters and amides in the form of their water-soluble hydrogen chloride addition salts. It is, of course, understood that other salts will serve the same purpose and are within the scope of my invention. Such salts include the following, which are conveniently formed by treating the free base form of the appropriate ester, thiol ester or amide of my invention with the appropriate non-toxic inorganic or organic acids, for instance I can thus obtain the hydrobromides, the sulfates, the phosphates, the sulfamates, the tartrates, the citrates, the succinates, the acetates, the ethanesulfonates, the benzoates, the oleates, and the like.

The following examples will further illustrate specific embodiments of the invention.

EXAMPLE 1

A. Coumarilic acid chloride

A mixture of 76.7 g. (0.47 mole) of coumarilic acid and 328.4 g. (2.76 moles) of thionyl chloride was heated slowly on a steam bath at approximately 45° C. for two hours. The mixture was then refluxed for two hours and allowed to stand overnight. The thionyl chloride was removed by distillation and the product distilled at 130–133° C. and 9 mm. The yield of coumarilic acid chloride having the formula

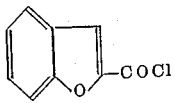

was 77.8 g., melting at 51–53° C.

Other intermediate coumarilic acid chlorides which are formed when the appropriate coumarilic acids are treated with thionyl chloride as in the procedure described in the immediately preceding paragraph include the following: 3-methylcoumarilic acid chloride, 3-isobutylcoumarilic acid chloride, 3-n-hexylcoumarilic acid chloride, 6-n-hexylcoumarilic acid chloride, and the like.

B. 2-dimethylaminoethyl coumarilate hydrochloride

A solution of 4.5 g. (0.05 mole) of 2-dimethylaminoethanol in 25 ml. of dry benzene was added, with stirring and cooling, to a solution of 9.03 g. (0.05 mole) of coumarilic acid chloride. The reaction mixture, which crystallized during the addition of the amino alcohol, was heated, cooled and absolute ether was added. The product which precipitated was collected by filtration, washed with absolute ether and recrystallized several times from absolute ethanol-n-hexane, yielding the hydrochloride of 2-dimethylaminoethyl coumarilate as a white crystalline substance, M. P. 187.5–188.8° C. (corr.), and having the formula

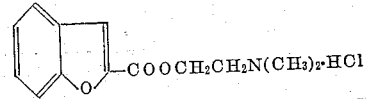

Anal.—Calcd. for $C_{13}H_{16}ClNO_3$: C, 57.87; H, 5.98; Cl, 13.11. Found: C, 58.08; H, 5.96; Cl, 13.22.

2-dimethylaminoethyl coumarilate hydrobromide is formed when the above procedure is carried out, but substituting coumarilic acid bromide (from the acid and $PBr_3$) for coumarilic acid chloride.

In addition, other tertiary-aminoalkyl coumarilates in the form of their hydrochlorides which can be prepared by following the directions given above in the reaction of coumarilic acid chloride and 2-dimethylaminoethanol and using the appropriate acid chloride and tertiary-aminoalkanol include the following: 6-dimethylaminohexyl coumarilate, 5 - diethylamino - 2-aminohexyl coumarilate, 3 - (1 - pyrrolidyl) - pentyl 3 - methylcoumarilate, 3 - (1 - pyrrolidyl) - propyl 3-isobutylcoumarilate, 2-(4-morpholinyl) - ethyl 3-n-hexylcoumarilate, 2-di-n-butylaminoethyl coumarilate, 2-(2,5-dimethyl-1-pyrrolidyl) - ethyl 3-methylcoumarilate, 2-(3-ethyl-1-piperidyl) ethyl 6-n-hexylcoumarilate, and the like.

EXAMPLE 2

N-(3-diethylaminopropyl) coumarilamide hydrochloride

A solution of 6.5 g. (0.05 mole) of 3-diethylaminopropylamine in 25 ml. of dry benzene was added to a solution of 9.03 g. (0.05 mole) of coumarilic acid chloride in 50 ml. of dry benzene, whereupon a thick gummy paste separated. The reaction mixture was chilled, the solvent removed by decantation, the residual material triturated with ethyl acetate on a steam bath, and the mixture cooled, with crystallization resulting. The crystalline product was filtered, washed with absolute ether and recrystallized several times from absolute ethanol-n-hexane to yield the hydrochloride of N-(3-diethylaminopropyl) coumarilamide, M. P. 81.0–84.0° C. (corr.), having the formula

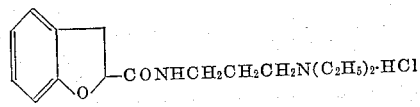

Anal. — Calcd. for $C_{16}H_{23}ClN_2O_2$: Cl, 11.41. Found: Cl, 11.26.

N-(3 - diethylaminopropyl) coumarilamide hydrobromide is formed when the above procedure is followed, but using coumarilic acid bromide instead of coumarilic acid chloride.

In addition, other N-(tertiary-aminoalkyl) - coumarilamides in the form of their hydrochlorides which can be prepared according to the foregoing procedure using the appropriate acid chloride and tertiary-aminoalkylamine include the following: N-(6-dimethylaminohexyl) coumarilamide, N - (5-diethylamino - 2 - pentyl)-3-methylcoumarilamide, N-[3 - (1 - pyrrolidyl)propyl]-3-isobutylcoumarilamide, N-[2-(4-morpholinyl) ethyl]-3-n-hexylcoumarilamide, N - (2-di-n-butylaminoethyl) coumarilamide, N-[2-(2,5-di-methyl - 1-pyrrolidyl) ethyl]-6-n-hexylcoumarilamide, N-(2-diethylaminoethyl)-6-n-hexoxycoumarilamide, N-[3-(1-piperidyl)propyl]-3-n-propyl-6-isobutoxycoumarilamide, N-[3-(2-methyl-1-pyrrolidyl)propyl]-6-n-amoxycoumarilamide, N-(3-diethylaminopropyl)-3-ethyl-6-methoxycoumarilamide, N-(2-di-n-amylaminoethyl)-3-methyl-6-n-butoxycoumarilamide, and the like.

EXAMPLE 3

*2-diethylaminoethyl thiolcoumarilate hydrochloride*

This preparation was carried out as in Example 1B except 6.7 g. (0.05 mole) of 2-diethylaminoethanethiol was used in place of 2-dimethylaminoethanol. The resulting product, M. P. 209.5–210.5° C. (corr.), has the formula

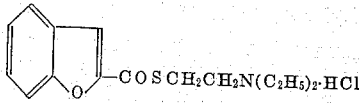

*Anal.*—Calcd. for $C_{15}H_{20}ClNO_2S$: S, 10.22; Cl, 11.30. Found: S, 10.30; Cl, 11.10.

2-diethylaminoethyl thiolcoumarilate in the form of its hydrobromide results when the above procedure is followed, but using coumarilic acid bromide in place of coumarilic acid chloride.

In addition, other tertiary-aminoalkyl thiolcoumarilates in the form of their hydrochlorides which can be prepared according to the above procedure using the appropriate acid chloride and tertiary-aminoalkanethiol include the following: 6-dimethylaminohexyl thiolcoumarilate, 5-diethylamino-2-pentyl 3-methylthiolcoumarilate, 3-(1-pyrrolidyl)propyl 3-isobutylthiolcoumarilate, 2-(4-morpholinyl)ethyl 3-n-hexylthiolcoumarilate, 2-di-n-butylaminoethyl thiolcoumarilate, 2-(2,5-dimethyl-1-pyrrolidyl)ethyl 6-n-hexylthiolcoumarilate, 2-diethylaminoethyl 6-n-hexoxythiolcoumarilate, 3-(1-piperidyl)propyl 3-n-propyl-6-isobutoxythiolcoumarilate, 3-(2-methyl-1-pyrrolidyl)propyl 6-n-amoxythiolcoumarilate, 3-diethylaminopropyl 3-ethyl-6-methoxythiolcoumarilate, 2-di-n-amylaminoethyl 3-methyl-6-n-butoxythiolcoumarilate, and the like.

EXAMPLE 4

*3-(2-methyl-1-piperidyl)propyl coumarilate hydrochloride*

When the procedure described hereinabove under Example 1B was followed but using 7.9 g. (0.05 mole) of 3-(2-methyl-1-piperidyl)propanol instead of 2-dimethylaminoethanol, the resulting product is the hydrochloride of 3-(2-methyl-1-piperidyl)propyl coumarilate, M. P. 180.0–181.2° C. (corr.), having the formula

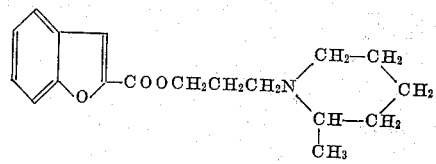

*Anal.*—Calcd. for $C_{18}H_{24}ClNO_3$: C, 63.99; H, 7.16; Cl, 10.50. Found: C, 64.12; H, 7.07; Cl, 10.34.

EXAMPLE 5

*4-diethylaminobutyl thiolcoumarilate hydrochloride*

This thiol ester salt was formed when the procedure illustrated hereinabove as Example 1B is carried out, but using 8.1 g. (0.05 mole) of 4-diethylaminobutanethiol instead of 2-dimethylaminoethanol. It melts at 153.1–153.9° C. (corr.) and has the formula

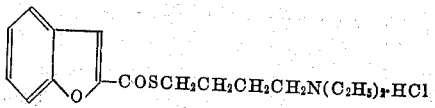

*Anal.*—Calcd. for $C_{17}H_{24}ClNO_2S$: S, 9.38; Cl, 10.37. Found: S, 9.48; Cl, 10.10.

EXAMPLE 6

*2-(2,6-dimethyl-1-piperidyl)ethyl coumarilate hydrochloride*

This ester hydrochloride was prepared following the directions given in Example 1B, but using 7.9 g. (0.05 mole) of 2-(2,6-dimethyl-1-piperidyl)ethanol in place of 2-dimethylaminoethanol. The resulting salt was purified further by triturating it twice with acetone and then recrystallized from absolute ethanol and acetone. The product, melting at 207.6–208.8° C. (corr.), has the formula

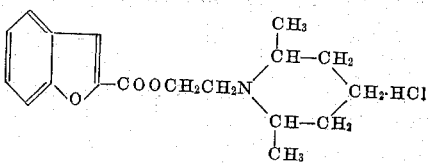

*Anal.*—Calcd. for $C_{18}H_{24}ClNO_3$: C, 63.99; H, 7.16; Cl, 10.50. Found: C, 64.04; H, 7.24; Cl, 10.42.

EXAMPLE 7

A. *3,6-dimethylcoumarilic acid chloride*

This preparation was carried out according to the procedure of Example 1A described hereinabove except that the starting acid was 3,6-dimethylcoumarilic acid instead of coumarilic acid and that the product was not distilled. After removal of the benzene and excess thionyl chloride by distillation, the residue was heated with dry benzene and the benzene removed by distillation, whereupon the residue crystallized. This crystalline product, which was used in subsequent preparations without further purification, has the formula

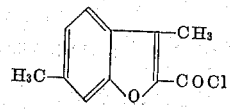

B. *2-dimethylaminoethyl 3,6-dimethylcoumarilate hydrochloride*

This preparation was carried out using the procedure illustrated hereinabove as Example 1B, but using as the reactants 16.7 g. (0.08 mole) of 3,6-dimethylcoumarilic acid chloride and 7.5 g. (0.08 mole) of 2-dimethylaminoethanol. The resulting product, which melted at 187.4–188.8° C. (corr.) after recrystallization from isopropanol, has the formula

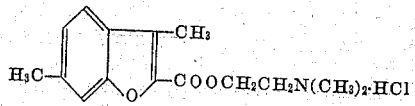

*Anal.*—Calcd. for $C_{15}H_{20}ClNO_3$: C, 60.50; H, 6.77; Cl, 11.91. Found: C, 60.34; H, 6.73; Cl, 11.76.

EXAMPLE 8

*3-(2-methyl-1-piperidyl)propyl 3,6-dimethylcoumarilate hydrochloride*

This compound was prepared following the procedure of Example 7B, using 12.8 g. (0.08 mole) of 3-(2-methyl-1-piperidyl)propanol instead of 2-dimethylaminoethanol. It melts at 184.0–185.2° C. (corr.) and has the formula

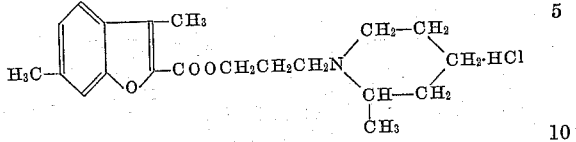

*Anal.*—Calcd. for $C_{20}H_{28}ClNO_3$: C, 65.65; H, 7.71; Cl, 9.69. Found: C, 65.94; H, 7.63; Cl, 9.38.

EXAMPLE 9

A. 4-methyl-7-n-butoxycoumarin dibromide

A solution of 140.3 g. (0.61 mole) of 4-methyl-7-n-butoxycoumarin [prepared in 61% yield by the reaction in meta-xylene solution of 7-hydroxy-4-methylcoumarin and n-butyl benzenesulfonate in the presence of anhydrous potassium carbonate; M. P. 51–52° C.; Bose, et al., Ann. Biochem. Exptl. Med. 5, 1 (1945) give M. P. 51° C.] in 200 ml. of dry chloroform was placed in a one liter three-necked flask equipped with a Friederick condenser, calcium chloride tube, mechanical stirrer and an addition funnel. A solution of 97.6 g. (0.61 mole) of bromide in 85 ml. of dry chloroform was added dropwise over a period of three hours at room temperature, the reaction mixture being cooled occasionally with an ice bath to prevent the temperature from rising. Excess bromine was destroyed by adding slowly with stirring 200 ml. of a 20% aqueous solution of sodium sulfite. The cloroform layer was separated, washed with water, dried, and the chloroform removed by distilling in vacuo. The resulting light green crystals of 4-methyl-7-n-butoxycoumarin dibromide having the formula

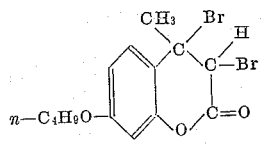

was immediately converted into the related coumarilic acid (see Example 9B).

B. 3-methyl-6-n-butoxycoumarilic acid

In a five liter three-necked flask equipped with a mercury sealed stirrer, 281.3 g. (5.0 moles) of potassium hydroxide was dissolved in 200 ml. of absolute ethanol. This solution was cooled and the 4-methyl-7-n-butoxy-coumarin dibromide of Example 9A was added thereto, and the resulting mixture was refluxed on a steam bath for thirty minutes. One and one-half liters of water were added and the alcohol removed by distilling in vacuo. After the solution had been transferred to a beaker and cooled by adding cracked ice, it was acidified with concentrated hydrochloric acid. The acid, which precipitated as a thick gum and crystallized slowly, was filtered and purified by dissolving it in a solution of 84 g. of sodium bicarbonate in 2000 ml. of water, heating the solution slightly while stirring with decolorizing charcoal, filtering the mixture, acidifying the filtrate with concentrated hydrochloric acid and chilling the acidified solution. There was thus obtained 148.1 g. of crude product, as dark orange crystals, which was recrystallized once from benzene and once from n-heptane, with decolorization using activated charcoal, thereby resulting in about 74.2 g. (44% yield) of 3-methyl-6-n-butoxycoumarilic acid, M. P. 130.2–131.2° C. (corr.), having the formula

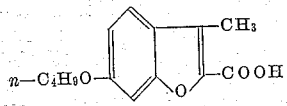

*Anal.*—Calcd. for $C_{14}H_{16}O_4$: C, 67.72; H, 6.42. Found: C, 67.50; R, 6.46.

In addition, other coumarilic acids which can be prepared according to the foregoing procedure when the appropriate 7-alkoxycoumarin derivatives are used include: 3-ethyl-6-n-hexoxycoumarilic acid, 3-n-propyl-6-isobutoxycoumarilic acid, 6-n-amoxycoumarilic acid, 3-ethyl-6-methoxycoumarilic acid, 3-methyl-6-ethoxycoumarilic acid, and the like.

C. 3-methyl-6-n-butoxycoumarilic acid chloride

This preparation was prepared following the procedures described above as Examples 1A and 7A, but using 30 g. (0.11 mole) of 3-methyl-6-n-butoxycoumarilic acid, 40.4 g. (0.39 mole) of thionyl chloride and 200 ml. of dry benzene. The resulting crude residue (after removal of excess thionyl chloride and benzene, addition of more dry benzene, heating the mixture and subsequent removal of the benzene), which had started to crystallize, was dissolved in 100 ml. of dry benzene. This benzene solution was then divided into two equal portions and used in subsequent preparations (Examples 9D and 10). The acid chloride has the formula

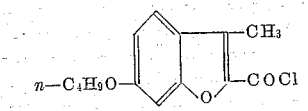

In addition, other coumarilic acid chlorides which can be prepared according to the foregoing procedure when the appropriate coumarilic acids are used include: 3-ethyl-6-n-hexoxycoumarilic acid chloride, 3-n-propyl-6-isobutoxy-coumarilic acid chloride, 6-n-amoxycoumarilic acid chloride, 3-ethyl-6-methoxycoumarilic acid chloride, 3-methyl-6-ethoxycoumarilic acid chloride, and the like.

D. 2-dimethylaminoethyl 3-methyl-6-n-butoxycoumarilate hydrochloride

This preparation was carried out according to the procedure described above in Example 1B, but using a solution of about 17.4 g. (0.065 mole) of 3-methyl-6-n-butoxycoumarilic acid chloride in 50 ml. of dry benzene (from Example 9C) and 5.8 g. (0.065 mole) of 2-dimethylaminoethanol. The crude crystalline ester hydrochloride, which was recrystallized several times from absolute ethanol, with decolorization using activated charcoal, melts at 158.0–160.0° C. (corr.) and has the formula

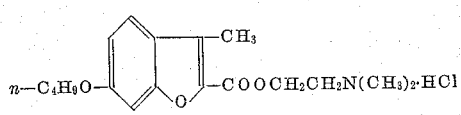

*Anal.*—Calcd. for $C_{18}H_{26}ClNO_4$: C, 60.75; H, 7.37; Cl, 9.96. Found: C, 60.85; H, 7.25; Cl, 9.77.

In addition, other tertiary-aminoalkyl 6-alkoxycoumarilates in the form of their hydrochlorides which can be prepared according to the foregoing procedure using the appropriate acid chloride and tertiary-aminoalkanol include the following: 2-(4-morpholinyl)ethyl 3-ethyl-6 - n - hexoxycoumarilate, 3 - (2 - methyl - 1 - pyrrolidyl)propyl 3-n-propyl - 6 - isobutoxycoumarilate, 2-di-n-amylaminoethyl 6-n-amoxycoumarilate, 5-diethylamino-2-pentyl 3-ethyl-6-methoxycoumarilate, 3-diethylaminopropyl 3-methyl-6-ethoxycoumarilate, 2-(2,5-dimethyl-1-pyrrolidyl)ethyl 3 - methyl - 6 - n - butoxycoumarilate, and the like.

EXAMPLE 10

3-(2-methyl-1-piperidyl)propyl 3-methyl-6-butoxycoumarilate hydrochloride

This ester salt was prepared according to the directions given hereinabove under Example 1B, but using a solution of about 17.4 g. (0.065 mole) of 3-methyl-6-n-butoxycoumarilic acid chloride in 50 ml. of dry benzene (from Example 9C) and 10.2 g. (0.065 mole) of 3-(2-methyl-1-piperidyl)-propanol. The crude crystalline ester hydrochloride, which was recrystallized, with decolorization using activated charcoal, until the melting point remained constant at 168.7–169.9° C. (corr.), has the formula

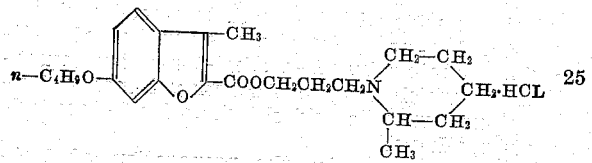

*Anal.*—Calcd. for $C_{23}H_{34}ClNO_4$: C, 65.15; H, 8.08; Cl, 8.36. Found: C, 65.08; H, 7.83; Cl, 8.10.

The compounds of my invention are local anesthetics.

I claim:

1. A compound having the formula

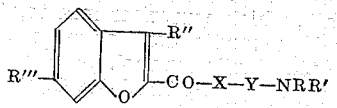

where X is a member of the group consisting of O, S and NH, Y is a lower alkylene radical, NRR' is a member of the group consisting of lower dialkylamino, 1-piperidyl, (lower alkylated)-1-piperidyl, 1-pyrrolidyl, (lower alkylated)-1-pyrrolidyl and 4-morpholinyl, R'' is a member of the group consisting of hydrogen and lower alkyl radicals and R''' is a member of the group consisting of hydrogen, lower alkyl radicals and lower alkoxy radicals.

2. A compound having the formula

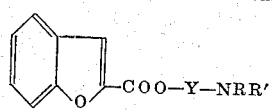

where Y is a lower alkylene radical and NRR' is a (lower alkylated)-1-piperidyl radical.

3. A compound having the formula

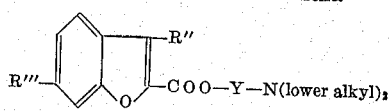

where R'' and R''' are each a lower alkyl radical and Y is a lower alkylene radical.

4. A compound having the formula

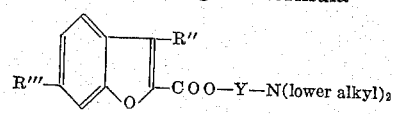

where R'' is a lower alkyl radical, R''' is a lower alkoxy radical and Y is a lower alkylene radical.

5. A compound having the formula

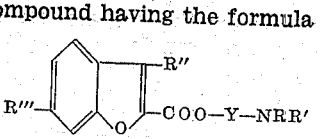

where R'' and R''' are each lower alkyl radicals, Y is a lower alkylene radical and NRR' is a (lower alkylated)-1-piperidyl radical.

6. A compound having the formula

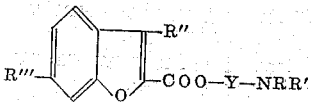

where R'' is a lower alkyl radical, R''' is a lower alkoxy radical, Y is a lower alkylene radical and NRR' is a (lower alkylated)-1-piperidyl radical.

7. 3-(2-methyl-1-piperidyl)propyl coumarilate having the formula

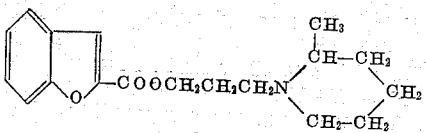

8. 2-dimethylaminoethyl 3,6-dimethylcoumarilate having the formula

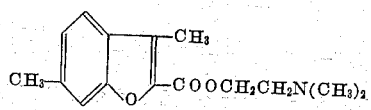

9. 2 - dimethylaminoethyl 3 - methyl - 6 - n - butoxycoumarilate having the formula

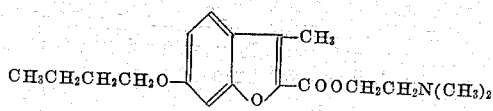

10. 3 - (2 - methyl - 1 - piperidyl)propyl 3,6-dimethylcoumarilate having the formula

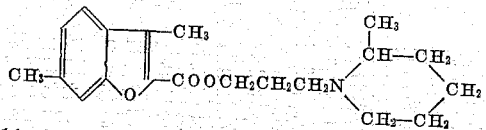

11. 3 - (2 - methyl - 1 - piperidyl)propyl 3-methyl-6-n-butoxycoumarilate having the formula

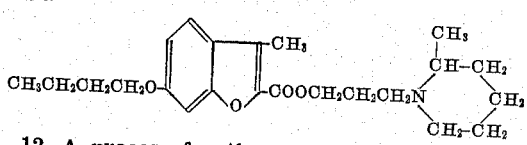

12. A process for the preparation of a compound having the formula

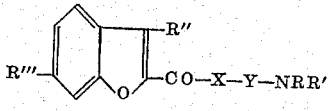

where X is a member of the group consisting of O, S and NH, Y is a lower alkylene radical, NRR' is a member of the group consisting of lower dialkylamino, 1-piperidyl, (lower alkylated)-1-piperidyl, 1- pyrrolidyl, (lower alkylated)-1-pyrrolidyl and 4-morpholinyl, R'' is a member of the group consisting of hydrogen and lower alkyl radicals and R''' is a member of the group consisting of hydrogen, lower alkyl radicals and lower alkoxy radicals, which comprises reacting the corresponding coumarilic acid halide with a tertiary-amino compound of the formula

13. A process for the preparation of a compound having the formula

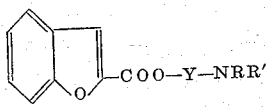

where Y is a lower alkylene radical and NRR' is a (lower alkylated)-1-piperidyl radical which comprises reacting the corresponding coumarilic acid chloride with a tertiary-aminoalkanol of the formula HO—Y—NRR'.

14. A process for the preparation of a compound having the formula

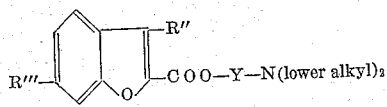

where R'' and R''' are each lower alkyl radicals and Y is a lower alkylene radical, which comprises reacting the corresponding coumarilic acid chloride with a tertiary-aminoalkanol of the formula HO—Y—N(lower alkyl)$_2$.

15. A process for the preparation of a compound having the formula

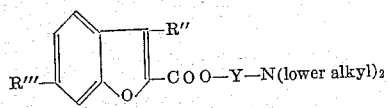

where R'' is a lower alkyl radical, R''' is a lower alkoxy radical and Y is a lower alkylene radical, which comprises reacting the corresponding coumarilic acid chloride with a tertiary-aminoalkanol of the formula HO—Y—N(lower alkyl)$_2$.

16. A process for the preparation of a compound having the formula

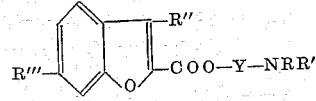

where R'' and R''' are each lower alkyl radicals, Y is a lower alkylene radical and NRR' is a (lower alkylated)-1-piperidyl radical which comprises reacting the corresponding coumarilic acid chloride with a tertiary-aminoalkanol of the formula HO—Y—NRR'.

17. A process for the preparation of a compound having the formula

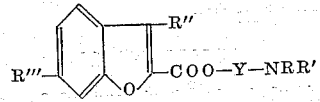

where R'' is a lower alkyl radical, R''' is a lower alkoxy radical, Y is a lower alkylene radical and NRR' is a (lower alkylated)-1-piperidyl radical which comprises reacting the corresponding coumarilic acid chloride with a tertiary-aminoalkanol of the formula HO—Y—NRR'.

18. A process for the preparation of 3-(2-methyl-1-piperidyl)propyl coumarilate, which comprises reacting coumarilic acid chloride with 3-(2-methyl-1-piperidyl)propanol.

19. A process for the preparation of 2-dimethylaminoethyl 3,6-dimethylcoumarilate, which comprises reacting 3,6-dimethylcoumarilic acid chloride with 2-dimethylaminoethanol.

20. A process for the preparation of 2-dimethylaminoethyl 3-methyl-6-n-butoxycoumarilate, which comprises reacting 3-methyl-6-n-butoxycoumarilic acid chloride with 2-dimethylaminoethanol.

21. A process for the preparation of 3-(2-methyl-1-piperidyl)propyl 3,6-dimethylcoumarilate, which comprises reacting 3,6-dimethylcoumarilic acid chloride with 3-(2-methyl-1-piperidyl)propanol.

22. A process for the preparation of 3-(2-methyl-1-piperidyl)propyl 3-methyl-6-n-butoxycoumarilate, which comprises reacting 3-methyl-6-n-butoxycoumarilic acid chloride with 3-(2-methyl-1-piperidyl)propanol.

RAYMOND O. CLINTON.

References Cited in the file of this patent

UNITED STATES PATENTS

| Number | Name | Date |
|---|---|---|
| 2,127,879 | Martin | Aug. 23, 1938 |